United States Patent [19]

Wood et al.

[11] 3,812,619

[45] May 28, 1974

[54] HORTICULTURAL FOAM STRUCTURES AND METHOD

[75] Inventors: Louis L. Wood, Potomac, Md.; Kurt C. Frishch, Grosse Ile, Mich.

[73] Assignee: W. R. Grace & Co., New York, N.Y.

[22] Filed: Aug. 10, 1972

[21] Appl. No.: 279,403

Related U.S. Application Data

[63] Continuation-in-part of Ser. No. 250,012, May 3, 1972, abandoned.

[52] U.S. Cl......... 47/58, 260/2.5 AT, 260/29.2 TN, 47/37, 47/56, 47/9, 71/64 G, 47/DIG. 7
[51] Int. Cl........................... A01g 9/10, A01g 31/00
[58] Field of Search ............... 47/2, 37, 1.2, 56, 58; 260/2.5, 29.2 TN; 71/1, 64

[56] References Cited
UNITED STATES PATENTS

| | | | |
|---|---|---|---|
| 2,726,219 | 12/1955 | Hill | 260/2.5 |
| 2,764,565 | 9/1956 | Hoppe et al. | 260/2.5 |
| 2,901,445 | 8/1959 | Harris | 260/2.5 |
| 2,948,691 | 8/1960 | Windemuth | 260/2.5 |
| 2,965,584 | 12/1960 | Elkin | 260/2.5 |
| 2,988,441 | 6/1961 | Pruitt | 47/37 UX |
| 3,245,776 | 4/1966 | Rubin | 71/1 |
| 3,288,732 | 11/1966 | Chapman et al. | 260/2.5 |
| 3,608,238 | 9/1971 | Reuter | 47/1.2 |
| 3,703,786 | 11/1972 | Swan | 47/56 |
| 3,706,678 | 12/1972 | Dietrich et al. | 260/2.5 AD |

*Primary Examiner*—Robert E. Bagwill
*Attorney, Agent, or Firm*—Eugene M. Bond

[57] ABSTRACT

The invention disclosed is for horticultural foam structures prepared by reacting an isocyanate capped polyoxyethylene polyol reactant with large amounts of an aqueous reactant containing seeds or the like. Desirably, the aqueous reactant further includes materials useful or necessary for plant growth. The resultant foam structures provide an effective means for protecting dormant seeds as well as means for sustaining seed germination and plant growth.

21 Claims, No Drawings

HORTICULTURAL FOAM STRUCTURES AND METHOD

This application for United States Letters Patent is a continuation-in-part of application Ser. No. 250,012, filed May 3, 1972, now abandoned.

This invention relates to horticultural foam structures using hydrophilic crosslinked polyurethane foams as a carrier. More particularly, the present invention relates to horticultural foam structures prepared from a capped polyoxyethylene polyol reactant which is then admixed with large amounts of an aqueous reactant containing seeds and optional materials as desired. The generated foams provide an effective means for protecting dormant seeds as well as means for sustaining seed germination and plant growth.

It is well known in the art that artificial structures such as glass wool, fabrics and the like may be used as a means for germination of seeds. In such structures, seeds are laminated within the structure along with layers of plant growth materials, or otherwise the seeds are adhered to the under-surface of the structure by using an adhesive or the like. Although these prior art structures are useful, they nevertheless are relatively costly to prepare and have thus received limited commercial accpetance. It has now been found, however, that by the present invention there is provided a simple efficient means of forming a horticultural foam structure where seeds or the like along with optional materials useful for plant growth are incorporated into an aqueous reactant at the time of foam generation. Thus, the seeds and optional materials are simply and uniformly disposed throughout the foam structure at the time of foam generation. The resultant foam structures are found to provide an effective means for protecting dormant seeds as well as means for sustaining seed germination and plant growth.

It is also well known that numerous attempts have been made in the prior art to produce hydrophilic polyurethane foams. Typically, these attempts have been based on inclusion of a separate hydrophilic additive into a hydrophobic polyisocyanate either during or after foaming; preparation of foams using reactants such as polyoxyethylene polyol, polyisocyanate with low, i.e., near stoichiometric amounts of water, and a catalyst; and foams based on non-catalytic reactions using linear polyoxyethylene diols, diisocyanate and varying amounts of water. Such foams, either by inclusion of materials necessary for foam generation or because of the criticality of the reaction have not provided useful structures for horticultural purposes. However, it has now been found that horticultural foams may be effectively prepared by using hydrophilic crosslinked polyurethane foams prepared simply by reacting a particular isocyanate capped polyoxyethylene polyol with large controlled amounts of an aqueous reactant containing seeds or the like with optional materials as desired. The thus generated foams are typically characterized by having a crosslinked, i.e., non-linear, molecular network which provides a useful means for seed transport, germination and plant growth.

Generally, the present crosslinked hydrophilic foam may be prepared by capping polyoxyethylene polyol with a polyisocyanate such that the capped product has a reaction functionality greater than two. The capped product is foamed simply by combining with an aqueous reactant containing seeds. Optionally, the capped product and/or aqueous reactant may contain a suitable crosslinking agent if desired, in which case the capped polyoxyethylene polyol product may have a functionality apporximating 2.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about six or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 20,000, and preferably between about 600 to 6,000, with hydroxyl functionality of about 2 or greater, preferably from about 2 to about.

Polyoxyethylene i.e., the oxyethylene adduct polyol, is terminated or capped by reaction with a polyisocyanate. The reaction may be carried out in an inert moisture-free atmosphere such as under a nitrogen blanket, at atmospheric pressure at a temperature in the range of from about 0°C. to about 120°C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisocyanates and polyisothiocyanates which are: PAPPI-901 (a polyaryl polyisocyanate as defined in U.S. Pat. No. 2,683,730), tolylene diisocyanate, triphenylmethane-4,4', 4'',-triisocyanate, benzene-1,3,5-triisocyanate, toluene-2,4,6-triisocyanate, diphenyl-2,4,4'-triisocyanate, hexamethylene diisocyanate, xylene diisocyanate, chlorophenylene diisocyanate, diphenylmethane-4,4'-diisocyanate, naphthalene-1, 5-diisocyanate, xylene-alpha,alpha'-diisothiocyanate, 3,-3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylenebis(phenylisocyanate), 4,4'-sulfonylbis(-phenylisocyanate), 4,4'-methylene di-orthotolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio.

The isocyanate capped polyoxyethylene polyol reaction products are formulated in such a manner as to give crosslinked, three dimensional network polymers on foaming. In order to achieve such infinite network formation on foaming, the reactive components may be formulated in one of the following by way of example. First, when water is the sole reactant with the isocyanate groups leading to chain growth during the foaming process, the isocyanate capped polyoxyethylene polyol reaction product must have an average isocyanate functionality greater than 2 and up to about 6 or more depending upon the composition of the polyol and capping agent components. Secondly, when the isocyanate capped polyoxyethylene polyol has an isocyanate functionality of only about two, then the water or aqueous reactant used may contain a dissolved or dispersed isocyanate-reactive crosslinking agent having an effective functionality greater than two. In this case, the reactive crosslinking agent is reacted with the capped polyoxyethylene polyol when admixed during and after the foaming process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with water or aqueous reactant with seeds dispersed therein and optionally containing a dissolved or dispersed reactive isocyanate-reactive crosslinking agent, leading to a crosslinked infinite network hydrophilic polyurethane foam.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing starter component such as glycerol, trimethylolpropane, or trimethylolethane and the like which leads to polyoxyethylene triols. The molecular weight of these polymeric triols so prepared may be varied greatly depending on the number of moles of ethylene oxide used in the reaction with the starter component. Starter components such as pentaerythritol and sorbitol likewise treated with ethylene oxide lead to polymeric polyoxyethylene tetrols and hexols, repsectively. Alternatively, polyols suitable for capping with polyisocyanate may be prepared from diols, triols, tetrols, hexols and polycarboxylic acids such as by the following mode:

REACTION I

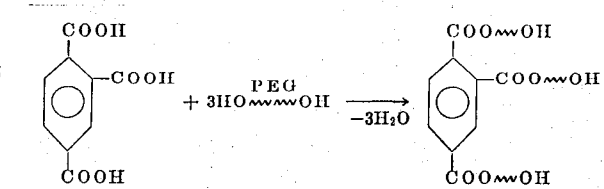

A useful polyisocyanate may be prepared from the reaction of a polyol with excess diisocyanate such as by the following mode:

REACTION II

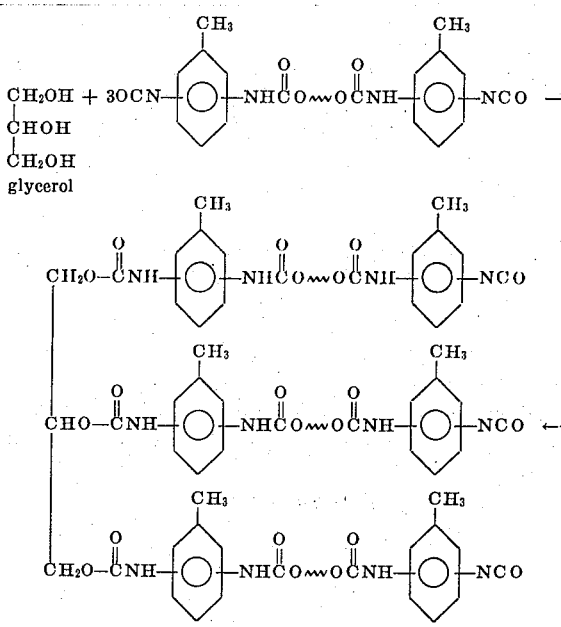

Any polyoxyethylene diols, triols, tetrols or hexols may be capped with isocyanate end groups by reaction with an appropriate amount of a polyisocyanate. The end capping reaction may be exemplified by the following illustrative equation:

REACTION III

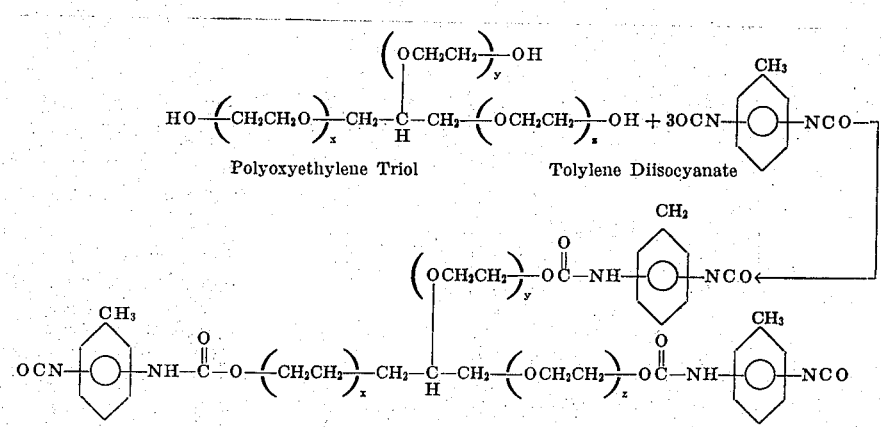

Isocyanate Capped Polyoxyethylene Triol (average functionality = 3)

Obviously the exact structure of the isocyanate capped polyoxyethylene polyols may be very complex and the simplified version shown in the above reactions is for purposes of illustration only. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product (A) having an isocyanate functionality of two. A polyol such as pentaerythritol having a reaction functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two which on treatment with the aqueous reactant containing seeds leads to new improved hydrophilic crosslinked polyurethane foam structures having horticultural utility. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average functionality greater than two. An example of a polymeric triisocyanate which may be similarly used is that shown in the descriptive Reaction III.

Still another useful mode for preparing crosslinked hydrophilic polyurethane foams is by using an isocyanate capped polyoxyethylene polyol reaction product having an average functionality of about two or greater which may be prepared as described previously. The technique following is crucial for those formulations where the average isocyanate functionality is only about two, because in these instances treatment with a large amount of water in foaming yields only a substantially linear, soluble thermoplastic foam having very little, if any, practical or commercial utility. Thus, when it is desired to carry out the foaming reaction using this latter technique, the water or aqueous reactant with seeds which is used is pre-treated to contain a polyfunctional crosslinking agent which is reactive with isocyanate end groups of the capped reaction product. Such crosslinking agents may be solubilized or dispersed in the water or aqueous reactant, and must be sufficiently compatible with the capped reaction product to be able to react with the isocyanate groups and thus cause a crosslinked, insoluble, thermosetting network to form while the foaming process takes place. In this technique, then, a crosslinking agent reactive with isocyanate groups is contained in the water or aqueous reactant. After mixing with the isocyanate capped polyoxyethylene polyol reaction products, a crosslinking reaction results which takes place during and after the foaming step begins to take place. The presence of the crosslinking agent in the water or aqueous reactant is essential when the isocyanate capped reaction product has a functionality of only about two; and only optional when the functionality thereof is greater than two.

Water soluble or water dispersible crosslinking agents desirably should be polyfunctional and reactive with isocyanate groups and include but are not limited to materials such as diethylenetriamine, triethylenetetramine, tetraethylene-pentamine, polyethyleneimine, glycerol, trimethylolpropane, pentaerythritol, tolylene-2,4,6-triamine, ethylene diamine, aminoethanol, trimethylenediamine, tetramethylenediamine, pentamethylenediamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than two used to prepare a three dimensional network polymer must be present in an amount sufficient to insure formation of the dimensional network. Thus, amounts of the capped polyoxyethylene polyol having an isocyanate functionality greater than two in the component to be foamed range from about 3 percent by weight of this component up to about 97 percent by weight of the component to be foamed. The maximum amounts of diisocyanate used are limited to that necessary to permit crosslinking to take place during foaming, as contrasted to formation of a linear polymeric structure, and the properties desired in the finally prepared foam.

The polyoxyethylene polyols used are water soluble reaction products derived from the polymerization of ethylene oxide in the presence of a polyfunctional starter compound such as water, ethylene glycol, glycerol, pentaerythritol, sorbitol and the like. The molecular weights may be varied over a wide range by adjusting the relative ratios of ethylene oxide monomer to starter compound. The preferred molecular weight ranges have been described previously.

It is possible and sometimes desirable to incorporate small amounts of a relatively hydrophobic comonomer into the ethylene oxide based polymerization products. Thus, comonomers, such as propylene oxide or butylene oxide may be copolymerized as a random copolymer, block-copolymer, or both, such that the copolymers remain hydrophilic while having other desirable features for certain applications, namely, improved low temperature flexibility, resistance to compression set, resiliency and the like. Up to about 40 mole percent but desirably about 25 mole percent or less of the relatively hydrophobic comonomer may be copolymerized with the ethylene oxide monomer and still yield hydrophilic crosslinked network foams when those products are used as polyol intermediates. Thus, throughout this text, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide contact ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with the seed containing aqueous component. For simplicity, this isocyanate capped reaction component will be referred to as resin reactant.

The aqueous component with seeds may be water, a water slurry or suspension, a water emulsion, or a water solution having water soluble materials disposed therein. The aqueous component containing seeds is referred to herein also as an aqueous reactant.

In contrast to typical polyurethane reactions such as those using catalyst or like promoters where one mole of —NCO is reacted with one half mole water, the present reaction proceeds simply with a large but controlled excess of water.

Using the present resin reactant and water in amounts from about 0.5 mole $H_2O$/mole NCO groups up to about 2 moles $H_2O$/mole NCO groups results in poor foaming unless materials such as surfactants or the like are included. Amounts up to about 2 moles $H_2O$/mole NCO require a catalyst. When using about 6.5 moles $H_2O$/mole NCO groups up to about 390 moles $H_2O$/mole NCO groups, surprisingly good foams result which improve in characteristics with added amounts of molar water. Thus, the available water content in the aqueous reactant is from about 6.5 to about 390 moles $H_2O$/NCO groups in the resin reactant, and desirably from about 20 to about 200 on the same basis.

"Available water" in the aqueous reactant is that water accessible for reaction with the resin reactant, and which is exclusive of water which may layer during reaction, or supplemental water which may be necessary because of further water-absorbtive or water-binding components or additives present in and foaming the aqueous reactant.

The reaction temperature to effect foaming obviously is regulated by the viscosity of the resin reactant. The reaction may proceed either as a batch reaction or as a continuous reaction. Either the resin reactant may be poured into the aqueous contact, or both may be combined simultaneously such as when using spray or froth application techniques. Both internal metering-/mixing spray equipment and external mixing spray equipment can be used as desired.

Ths use of large molar excesses of water in the aqueous reactant leads to several important advantages and improvements over the conventional polyurethane foam compositions of the prior art. For example, in conventional polyurethane foam compositions the water concentration must be carefully controlled to near the theoretical amount, usually an amount less than about 2.0 moles $H_2O$/NCO groups in the polyurethane reaction components. This low reactant concentration dictates the use of a catalyst to promote the rate of the polymerization foaming reaction, and requires an intensive mixing step to achieve good mixing of reactants and catalyst so as to insure a controllable and uniform cellular product. Because of requiring involved processing, chemicals and expensive processing techniques, prior art urethane structures are not readily adaptable to horticultural structure. In contrast, the present technique requires large but controlled excess of water, e.g., typically about 6.5 moles $H_2O$/NCO to about 390 moles $H_2O$/NCO in the resin reactant. Using this technique, the product quality and uniformity is not highly sensitive to accuracy of metering or mixing of the aqueous reactant and the use of a polymerization catalyst or promoter is unnecessary. Further, conventional polyurethane foam systems have limitations in spray-up thicknesses due to the fact that the high exotherm liberated during foaming, and foam thickness per single pass of the spray gun. In contrast, the compositions of the present invention have excess amounts of water present as a diluent which moderates the polymerization exotherm, permits the spray-up of most any foam thicknesses per single pass without discoloration or overheating of the foam product. Further, conventional foam production, processing and spraying equipment requires the frequent and extensive use of toxic or flammable organic solvents such as acetone, tricresyl phosphate, methylene chloride and the like for cleaning and purging purposes. With the present hydrophilic polyurethane components, cleaning may be carried out conveniently with simple, non-toxic and non-flammable aqueous solutions. Thus, advantages of the present components include facilitating metering and mixing, equipment clean-up, moderating reaction exotherm, reducing the fire hazard of the system during spraying, and permitting the use of very simple and low cost foam fabrication equipment.

Because large amounts of water are in the aqueous reactant during reaction, it is possible to combine a great variety of materials in the aqeuous reactant which are otherwise not possible with limited water reacting systems.

The aqeuous reactant may contain any desirable amounts of seeds, although it is recognized that other plant reproduction members such as bulbs and the like may also be included. An example of an amount of seeds effectively combined in preparing the present horticultural structures is about 0.001 to about 3 pounds seed per pound of resin to be reacted. Obviously, the seed type, size and plant density all regulated the amount of seed employed in the aqeuous reactant.

The aqeuous reactant and resin reactant fomrulation containing the seeds and other additives, after admixture, can be sprayed or frothed directly onto the soil plot and thus forms a foam-in-place ground cover from which gases or plants will germinate and grow if treated with due care. Alternatively, the admixed formulation can be sprayed or frothed or poured onto a release belt or into a mold, formed into a foamed sheet, tape or bun and then cut or sliced into various shaped and sizes. After dying out the excess moisture, these seed sheets, tapes, buns, etc., may be stacked or rolled up and stored for extended periods of time with little or no adverse effects on the seeds contained therein. When ready for use, the sheets can be spread out on the ground, properly staked to hold them in place, and then sprinkled with water and maintained in proper condition for seed germination and plant growth. Root structures thus developed penetrate, and spread through the foam cells and eventually take root in the soil beneath. This is an excellent way, for example, to make and use an "artificial sod," a soil stabilizing ground cover for construction sites, road side embankments, lawn sites, gardens, and the like. The unique hydrophilic nature of the foam combined with the open cell, porous, absorptive structure thereof to give a very beneficial growth medium. Seeds are held in place so they cannot be blown away by the wind or be carried away by birds, vermin and the like.

Large amounts of water soluble or water dispersible materials useful for seed germination and plant growth may be added to the aqueous reactant. These materials may be added to the aqueous reactant up to 800 percent by weight of the amount of water in the aqueous reactant, depending of course on the particular material and its weight. Useful additives to the aqueous reactant include organic and inorganic fertilizers, soil conditioners, soil bases, conditioners, fungicides, insecticides, bactericides, pesticides, fibers, mulch, cellulosics, pigments, dyes, radiation control substances, enzymes, or the like. By homogeneously distributing these materials in the aqueous reactant, it is possible to effect wide distribution of these materials throughout the finally prepared foam. Some or all of the above additives added may also be combined into the resin reactant as desired.

The present foams have great utility for decorative, protective, nutrient and weed retardant surfaces. The feature of water vapor permeability of these foams and sponges resulting from the hydrophilic nature of the polyoxyethylene polyol reactant, renders them especially attractive for horticultural utility. They are also useful as plant potting media; matrices for flower arrangements, cuttings, etc.; root balling media; hydroponics media; etc. Because of the ease and simplicity of formulation and foaming procedures, these materials are conveniently suited for use by commercial greenhouse operators, farmers, landscapers, florists, horticulturists and even the do-it-yourself home gardeners and experimentalists.

These foams may contail soil, nutrients, and/or fillers for horticultural applications including use as a matrix for plant growth. For this purpose, the present foams are effective for supporting seedlings which may be simply transplanted without root damage.

A wide variety of solid materials may be added to the present foams to produce changes in properties. These solid materials which may be added include for example finely divided carbon particles for retarding light passage while absorbing heat beneficial to growth of the seeds. Organic fillers including shredded cornstalks, straw, hay and the like may be added as desired.

For many applications, especially in those instances where the foam composites of the present invention are in contact with plants or used as ground covers (artificial sod, mulch sheets, seed tapes and the like) it is highly desirable that the foamed polymeric material be biodegradable, and thus become absorbed ultimately into the soil without the need for recovery of the foam and disposal by burning or by land fill, etc. It is possible within the scope of this invention to accomplish this objective by proper design of the molecular microstructure of the foam forming polymeric intermediates. For example, the use of relatively low M.W. polyoxyethylene polyols (below about 600 M.W.) and partial chain extension of same with the use of polybasic acids to form ester linkages which are responsive to slow hydrolysis in the ambient environment and/or the inclusion of groupings easily cleaved by oxidation by the ambient atmosphere, including the rate promoting effect of ultraviolet radiation from the sun. In other instances, chemical agents may be added to deliberately promote biodegradation of the foam structure soon after the foam matrix has served its useful purpose in initiating and maintaining the growth of the seeds or seedlings, etc.

Even in the absence of seeds or seedlings, the foams of this invention can be used for a variety of functional or decorative purposes. In spray form or as pre-formed sheets, the foams for example can be used as an agricultural mulch, i.e., a cover around certain plant crops that serves to keep the soil warm, moist and weed-free during the critical portions of the growing season, especially in arid climactic conditions. Further, these seed-free compositions containing various additives such as pesticides or plant nutrients and the like can be sprayed and foamed-in-place directly onto the plants, bushes, fruit trees and the like or on the soil adjacent thereto to form a durable, functional, breathable, moisture absorptive foam coating that serves a useful purpose over an extended time period during the growing season.

The present hydrophilic horticultural foams may be produced and applied in laminated form, i.e., supported on a porous open mesh scrim such as burlap or other woven or nonwoven fabric, paper, paper board, or like substrate. Such supporting substrate networks permit enhanced dimensional stability of the foam structure when very low thicknesses of foam are desired for purposes of economy of coverage of especially large areas.

The following examples will aid in explaining, but should not be deemed as limiting, practice of the present invention. In all cases, unless otherwise noted, all parts and percentages are by weight.

EXAMPLE 1

To a reaction vessel containing 3,092 grams, representing 1 mole, 3 eq. OH, of a triol prepared from potassium hydroxide catalyzed reaction of 92 grams anhydrous glycerol with 3300 grams of ethylene oxide, where added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant lever of 0.79 meq. NCO/gram relative to a theoretical content of 0.83 meq. NCO/gram. The resultant pale yellow syrup was found to solidify at about 30°–35°C., was soluble in toluene, and acetone, readily reacts with water, and had the following formula:

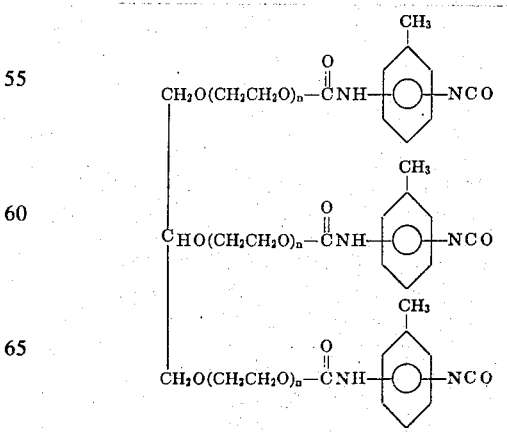

where $n$ has an average value of about 22. The theoretical molecular weight of the resin product is about 3615.

A foam was prepared by adding to 25 grams of this polyoxyethylene triisocyanate with good stirring, a mixture of 25 grams water and 1.0 grams of annular Italian rye grass seed. After mixing for 5 seconds to achieve an initial cream state, the reaction mixture was poured onto a 12 inch by 12 inch glass plate and allowed to expand and cure to a tack free surface for 5 minutes. The resultant foam pad had a thickness of about ¼ inch. One half of the pad sample was allowed to dry out and stand at 25°C., 30 percent relative humidity in the dark for one month with no apparent germination of the grass seed. The remaining half of the seed-foam pad was kept moist with 50 ml. water applied every 48 hours. After 6 days of exposure to daylight the grass seed germinated. A uniform green carpet of grass formed after 11 days.

The first half section of the foam-seed pad sample which had been kept in the dry, dark ungerminated state for one month was then moistened and kept moist and in the light as described above. Again, the seed germinated within 7 days and a uniformly green blanket of grass sod formed in 12 days.

EXAMPLE 2

The procedure of Example 1 was repeated except the resin was mixed with water containing 0.5 gram of grass green (phthalocyanine pigment) color. Corresponding results were realized compared to Example 1. Similar results were obtained also using a water soluble green dye.

EXAMPLE 3

The procedure of Example 1 was repeated except using a modified foam prepared as follows. To a reaction vessel containing 4,136 grams, representing 1 mole, 4 eq. OH, of a tetrol prepared from sodium methoxide catalyzed reaction of 136 grams pentaerithritol with 4400 grams of ethylene oxide, were added 696 grams of tolylene diisocyanate having about 80/20 mixture of 2,4 isomer/2,6, isomer. The reaction was carried out using the procedure of Example 1. The actual isocyanate content noted was 0.86 meq. NCO/gram relative to a theoretical content of 0.83 meq. NCO/gram. The recovered product was a colorless syrup which solidified at about 35°–40°C., was soluble in toluene and acetone, readily reacts with water, and had the formula:

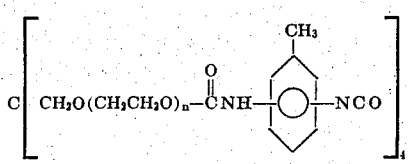

where $n$ has an average value of about 22. The theoretical molecular weight of the resin product is about 4832.

19.2 grams, representing 0.016 eq. NCO, of the recovered capped resin product from this example, were reacted with a slurry of 20 grams water, about 1.1 moles, and 2.0 grams fine grass seed. The moles $H_2O/NCO$ groups was 73.2. A similar horticultural structure resulted.

EXAMPLE 4

20 grams of the resin reactant prepared in Example 1 was reacted with an aqueous reactant having 50 grams water, 3.0 grams seed, and 50 grams of an equal mixture of humus, sand, and vermiculite in suspension. The product foam was characterized with a soft, open cell structure which was flexible and did not crumble when handled, and proved useful in sustaining plant growth.

EXAMPLE 5

20 grams of the resin reactant prepared in Example 2 was reacted with an aqueous reactant having 20 grams water and 40 grams of sand. The product foam was characterized with an abrasive texture, open cell flexible foam structure which was fairly strong against tear, and which was capable of sustaining plant life.

EXAMPLE 6

20 grams of the resin reactant prepared in Example 2 was reacted with an aqueous reactant having 160 grams water and 80 grams Vermiculite fines. The product foam was a semi-flexible foam having about twice the volume of 100 grams Vermiculite plux 160 grams of water

EXAMPLE 7

To illustrate the ease and simplicity of fabrication of foam products, the following procedure was performed. One liter of the capped polyoxyethylene polyol product mixture from Example 1 was charged into one chamber of a Binks Model 181N dual nozzle spray gun. One liter of tap water containing 70 grams fine Kentucky bluegrass seeds and 50 grams nutritional soil was charged in the other chamber. Air pressure was applied to both chambers at 40 to 50 psi.

The resultant co-sprayed product aerosol stream was directed against a surface where after 10 minutes the foam was a tack-free adherent, and contour conforming coating or sheet. Because of complete absence of soluble active agents and the like, this product was especially suited for use as a plant growth structure for spray application against a ground surface from a moving vehicle.

EXAMPLE 8

In another variation of co-spray mixing technique described in Example 7, the product aerosol stream was directed briefly onto a metal surface until a layer of approximately 3–5 mils of blended unfoamed composition was obtained. After the foaming reaction was completed, which required about 3–5 minutes additional time, the foam layer was approximately ½ inch thick, adhered tenaciously to the metal and was capable of sustaining plant life.

EXAMPLE 9

The procedure of Example 1 was repeated except using a modified resin prepared as follows. A solution of 92 grams glycerol representing 1 mole, 3 eq. OH, and 1000 grams of polyoxyethylene glycol 1000 representing 1 mole, 2 eq. OH was outgassed at 100°C. and 10 Torr for two hours. To the outgassed solution was added 870 grams representing 5 moles tolylene diisocyanate having an 80/20 mixture of 2,4 isomer/2,6 isomer. The reaction solution was stirred at 60°C. for four hours whereupon the actual isocyanate content reacted a constant 2.49 meq. NCO/gram relative to a theoretical content of 2.54. The resin product had a pale orange color, a density of 1.10, and a viscosity (Brookfield No. 4 spindle) at 25°C. of 13,400 cps. 31.3 parts of the resin product representing 50 mole percent had a theoretical molecular weight of 615, and the following formula (idealized):

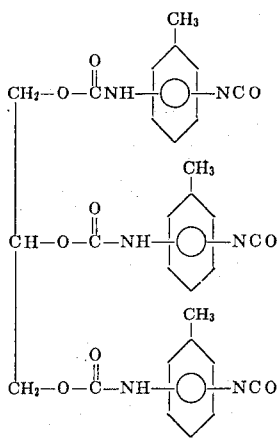

while 68.7 parts of the resin product representing 50 mole percent was found to be

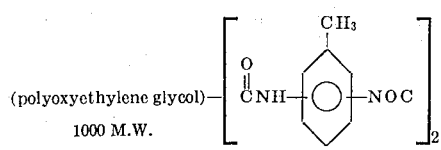

having a theoretical molecular weight of 1348. The actual NCO content of this resin product was 2.49 meq. NCO/gram relative to a theoretical content of 2.54 meq. NCO/gram.

EXAMPLE 10

The procedure of Example 9 was repeated except using polyoxyethylene glycol having a weight average molecular weight of 4.000.

EXAMPLE 11

The procedure of Example 1 was repeated except using a resin prepared as follows. 630 grams of polyoxyethylene glycol representing 1 mole was reacted as described in the procedure of Example 1 with 2.1 grams diethylene triamine (DETA) and 348 grams (2 moles) of 80/20 ratio of 2,4/2,6 tolylene diisocyanate.

EXAMPLE 12

The procedure of Example 1 was repeated except using a resin prepared by capping a polyoxyethylene diol with a polyisocyanate having a functionality greater than 2, to give polyisocyanate foams with higher crosslink density and superior physical properties, lower solubility, and greater hydrolytic stability than foams from polyoxyethylene diisocyanates. Thus a 1000 gram portion, 0.25 eq. OH, of polyoxyethylene glycol of 4000 weight average molecular weight was outgassed at 110°C. and 10 Torr for two hours. Next, to this outgassed liquid was added at 60°C. 200 grams, 0.5 moles, 1.5 eq. NCO, of polymethylene polyphenylisocyanate commercially available under the name PAPI by Upjohn Co. This latter material has nearly three isocyanate groups per molecule and an isocyanate equivalent weight of 133. A corresponding result was realized.

EXAMPLE 13

The procedure of Example 1 was repeated except using a resin prepared by copolymers of 75 percent ethylene oxide and 25 percent propylene oxide along with methylene dicyclohexyl diisocyanate to form a triisocyanate that readily reacts with water slurry to give hydrophilic foams. A mixture of 13.4 grams, 0.1 mole of trimethylolpropane and 0.6 grams, 0.01 mole of potassium hydroxide was stirred at 100°–180°C. in the presence of 250 grams of ethylene oxide at 20 to 100 psi. After 3 hours the reaction pressure dropped to one atmosphere. To the reaction product syrup was then added 250 grams of propylene oxide with stirring at 100° to 180°C., and a pressure of 20 to 75 psi for 4 hours whereupon the reaction pressure at 100°C. dropped to one atmosphere. To this reaction product syrup having a brown color was added 500 grams of ethylene oxide. The reaction was stirred at 100°–180°C. for 12 hours whereupon the reaction pressure dropped to one atmosphere at 100°C. The resultant brown oil was stripped of volatiles at 50 to 100°C. at 10 Torr resulting with 978 grams of brown syrup having a hydroxyl content of 0.32 meq. OH/gram relative to 0.31 meq./gram theory.

To 931 grams, 0.30 OH, of the prepared triol was added 88.0 grams, 0.32 moles, of dicyclohexylmethane diisocyanate. The solution stirred at 60°C. for 8 hours whereupon the NCO content of the polymer reached a constant 0.33 meq./gram relative to 0.32 theory. The triisocyanate product was characterized as a light amber syrup having a viscosity of 12,000 cps. at 25°C. (Brookfield).

EXAMPLE 14

The procedure of Example 1 was repeated using a resin prepared from a polyoxyethylene polyol having a hydroxyl functionality greater than two, a polyisocyanate plus catalysts and surfactants were all reacted together at the same time in a one shot manner with large amounts of water seed mixture as follows. 30.9 grams, 0.01 mole having 0.03 eq. OH of polyoxyethylene triol, having a weight average molecular weight of 3092 and prepared as described in Example 1 was mixed with 5.5 grams of diisocyanate, 0.0305 mole, 0.063 eq. NCO, 0.1 gram L520 silicone surfactant by Union Carbide, and 0.05 gram dibutyl tin dilaurate plus 0.05 gram N-methyl diethanol amine. To this mixture was added immediately 100 grams slurry of water and 50 grams by weight seed with vigorous stirring. Corresponding results were realized.

EXAMPLE 15

A slurry of 100 grams of pentaerythritol, 0.735 moles having 2.94 eq. OH in 860 grams of tolylene diisocyanate, 4.95 moles having 9.9 eq. NCO groups/gram and the mixture ratio 80/20 of 2,4 isomer/2,6 isomer was stirred for 24 hours. An orange solution resulted. To the orange solution was added 1000 grams outgassed polyoxyethylene glycol representing 1 mole having 2.0 eq. OH. These reactants were stirred about 67°C. for four hours followed by additional stirring at 25°C. for sixteen hours whereupon the isocyanate content reached a constant level of 2.63 meq. NCO groups/gram relative to theoretical value of 2.56 meq. NCO groups/gram. The resultant product had an orange color, a viscous syrup consistency at 25°C., and upon analysis was found to be a solution of about 31 percent by weight (42.5 mole percent) of the compound:

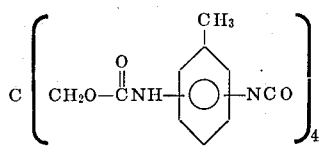

having a molecular weight, theory, of 832, in about 69% by weight (57.5 mole percent) of

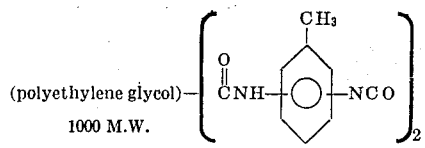

The NCO content of the mixture was 2.63 meq. NCO groups/gram actual, relative to 2.56 meq. NCO groups/gram, theory.

This resin product was foamed using the procedure of Example 1 except that the product foam was used as a matrix for tulip bulb contained in a flower pot.

EXAMPLE 16

To 1030 grams representing 1 eq OH of a triol prepared from 92 grams, 1 mole, glycerol and 3030 grams ethylene oxide, were added 168 grams, 1 mole of 1,6-diisocyanatohexane. The reaction solution was stirred at 60° to 70°C. for 6 hours whereupon the isocyanate content of the resin product reached a constant of 0.827 meq NCO/g relative to a theoretical value of 0.835. The resultant pale yellow product syrup solidified to a waxy solid at 35° to 40°C., and was found upon analysis to have the following formula (idealized):

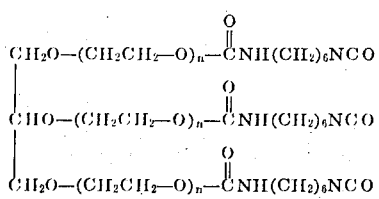

where $n$ is about 25 and the molecular weight, theory, is 3594. The resin product was reacted using the procedure of Example 1. Corresponding results were realized.

EXAMPLE 17

The procedure of Example 16 was repeated except using commercially available O.M. Scott's "Windsor grass seed". Corresponding growth was realized except the grass was greener and thicker.

Although the present invention has been defined with special reference to horticultural structures, it will be appreciated that the invention is readily applicable to agricultural usage generally. For example, these structures have effective application as mulch, root balling, roll-out seed tapes prepared such as by foaming a strip onto spaced seeds, spray application to roots during transplant, spray application onto ground surfaces, layering a pre-formed sheet onto ground surfaces especially for errosion control and the like. The present structures may contain seeds, plants, nutrients, fertilizers, pesticides, dyes, inorganic and organic fillers, and the like.

It is understood that the foregoing detailed description is given merely by way of illustration and that many variations may be made therein without departing from the spirit of this invention.

What is claimed is:

1. A method for preparing horticultural structures of improved crosslinked hydrophilic foams having three-dimensional networks, said method comprising, reacting a first component comprising isocyanate capped polyoxyethylene polyol having a reaction functionality greater than two, with a second component comprising aqueous reactant, the ratio of moles $H_2O$/moles NCO groups being about 6.5 to about 390 in said second and first components respectively, said second component containing horticultural material selected from the group consisting of humus, sand, vermiculite, or a mixture thereof.

2. The method of claim 1 wherein the polyoxyethylene polyol moiety of the isocyanate capped member has a molecular weight of about 200 to about 20,000, and a hydroxyl functionality of about 2 to about 6.

3. The method of claim 2 wherein the molecular weight is about 600 to about 6,000.

4. A method for preparing improved horticultural structures of hydrophilic foams having three-dimensional networks, said method comprising, reacting a first component comprising isocyanate capped polyoxyethylene polyol having a reaction functionality equal to about two, a second component comprising aqueous reactant, and a third component comprising a crosslinking agent having a reaction functionality greater than two, the ratio of moles $H_2O$/moles NCO groups being about 6.5 to about 390 in said second and first components respectively, said second component containing seeds and nutrients therefor.

5. A method for preparing horticultural structures of improved crosslinked hydrophilic foams having three-dimensional networks, said method comprising, reacting a first component comprising isocyanate capped polyoxyethylene polyol having a reaction functionality greater than two, with a second component comprising aqueous reactant, the ratio of moles $H_2O$/moles NCO groups being about 6.5 to about 390 in said second and first components respectively, said second component containing horticultural material selected from the group consisting of seeds, bulbs and plants.

6. The method of claim 5 herein the second component further includes a member of the group consisting of nutrients, fertilizers, and pesticides.

7. The method of claim 5 wherein said first component is mixed with said second component, after which the mixture is sprayed prior to effecting reaction.

8. The method of claim 5 herein said first and second components are separately sprayed to effect mixing, after which the mixture is reacted.

9. The method of claim 5 wherein said reaction is effected during spraying of said first component and said second component.

10. The method of claim 5 wherein the ratio of moles $H_2O$/moles NCO groups is from about 20 to about 200.

11. A method for preparing improved horticultural structures of hydrophilic foams having three-dimensional networks, said method comprising, reacting a first component comprising isocyanate capped polyoxyethylene polyol having a reaction functionality equal to about two, a second component comprising aqueous reactant, and a third component comprising a crosslinking agent having a reaction functionality greater than two, the ratio of moles H$_2$O/moles NCO groups being about 6.5 to about 390 in said second and first component respectively, said second component containing horticultural material selected from the group consisting of seeds, bulbs and plants.

12. The method of claim 11 wherein the crosslinking agent of the third component is a polyol.

13. The method of claim 11 wherein the crosslinking agent of the third component is a polythiol.

14. The method of claim 11 wherein the crosslinking agent of the third component is a polyisocyanate.

15. The method of claim 11 wherein the said three components are mixed, sprayed and reacted after being sprayed.

16. The method of claim 11 wherein the said three components are sprayed, mixed and then reacted after being sprayed.

17. The method of claim 11 wherein the polyoxyethylene polyol moiety of the isocyanate capped member has a molecular weight of about 200 to about 20,000, and a hydroxyl functionality of about 2 to about 6.

18. The method of claim 11 wherein the molecular weight is about 600 to about 6,000.

19. The method of claim 11 wherein the ratio of moles H$_2$O/moles NCO groups is from about 20 to about 200.

20. The method of claim 11 wherein the crosslinking agent of the third component is a polyamine.

21. The method of claim 11 wherein the second component further includes a member of the group consisting of nutrients, fertilizers and pesticides.

* * * * *